United States Patent [19]
Lewis

[11] 3,782,781
[45] Jan. 1, 1974

[54] SINGLE FLUID BOOSTER AND SYSTEM
[75] Inventor: Richard L. Lewis, South Bend, Ind.
[73] Assignee: The Bendix Corporation, South Bend, Ind.
[22] Filed: June 29, 1972
[21] Appl. No.: 267,296

[52] U.S. Cl. .................. 303/9, 303/10, 180/79.2 R, 60/54.5 P, 60/54.6 P
[51] Int. Cl. ...... B60t 13/16, B60t 13/00, B62d 5/06
[58] Field of Search .................. 303/9, 10, 13, 21 F; 180/79.2 R; 60/54.5 P, 54.6 P

[56] References Cited
UNITED STATES PATENTS

| | | | |
|---|---|---|---|
| 3,675,422 | 7/1972 | Drutchas et al. | 303/21 F X |
| 3,148,592 | 9/1964 | Schultz et al. | 60/54.6 P X |
| 2,875,843 | 3/1959 | Price | 180/79.2 R |
| 3,053,052 | 9/1962 | Garrison et al. | 60/54.6 P |
| 3,091,931 | 6/1963 | Rockwell | 60/54.5 P |
| 3,119,235 | 1/1964 | Lewis et al. | 60/54.5 P |
| 3,176,467 | 4/1965 | Van House | 303/9 X |
| 3,364,821 | 1/1968 | Gephart et al. | 60/54.5 P X |
| 3,503,655 | 3/1970 | Heimler | 303/21 F |
| 3,610,702 | 10/1971 | MacDuff | 303/21 F |
| 3,633,363 | 1/1972 | Larsen | 60/54.6 P X |

*Primary Examiner*—Robert S. Ward, Jr.
*Attorney*—Ken C. Decker et al.

[57] ABSTRACT

A vehicle hydraulic braking system is disclosed which includes a primary pressure source, a secondary pressure source which is actuated upon failure of the primary pressure source and which is operated by an electric motor, and a hydraulic brake booster which utilizes pressurized fluid from either of the pressure sources to provide a power assist to the vehicle operator when a brake application is effected. Normally, fluid is communicated from the primary pressure source to the booster, and from the booster to the vehicle's power steering gear to operate the latter. However, upon failure of the primary pressure source and subsequent actuation of the secondary pressure source, a valve which is responsive to actuation of the secondary pressure source diverts fluid from the power steering gear to the system reservoir, thereby conserving the entire fluid output of the secondary pressure source for operation of the brake booster alone.

9 Claims, 3 Drawing Figures

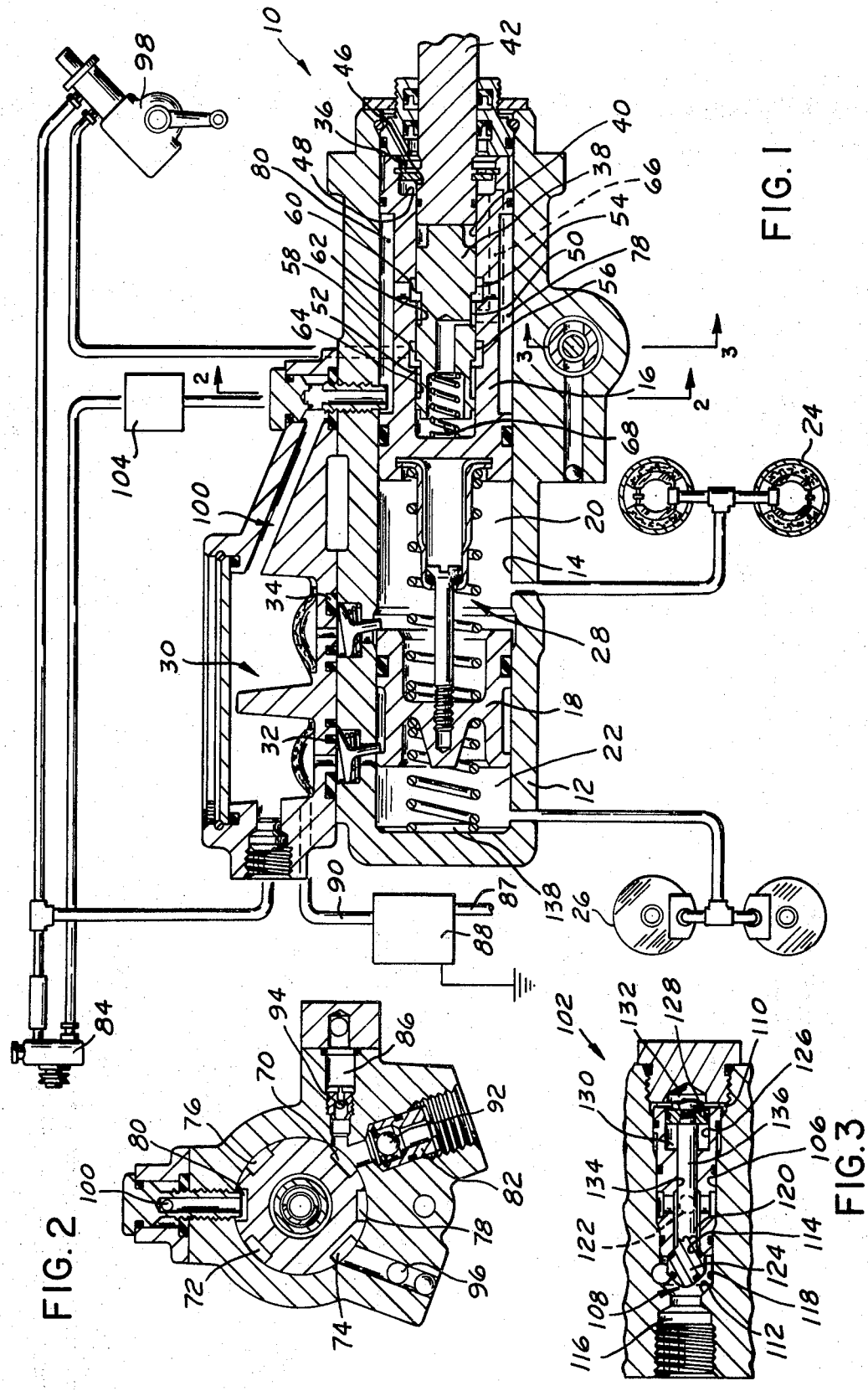

SINGLE FLUID BOOSTER AND SYSTEM

BACKGROUND OF THE INVENTION

This invention relates to a vehicle hydraulic braking system including a hydraulic brake booster which may be operated by both a primary fluid pump and a secondary fluid pump which is actuated upon failure of the primary fluid pump.

Most existing power brake units generally are operated by the manifold vacuum of the vehicle engine. However, these vacuum-actuated power brake units are expected to be replaced by hydraulically actuated power brake units in the near future. Ideally, in such a hydraulic power brake unit, the same fluid which is pumped by the vehicle's power steering pump to power the power steering gear may also be used to actuate the brakes of the vehicle, thereby considerably simplifying the vehicle braking system. However, the hydraulic brake boosters do not provide a power reserve to provide a power assist after the vehicle's engine stops running as do conventional vacuum-actuated units. Therefore, it is desirable to provide an auxiliary pump, operated by, for example, an electric motor, to provide pressurized fluid to the hydraulic brake booster upon failure of the vehicle's power steering pump, due to malfunction of the pump itself, to rupture of the vehicle's hydraulic lines, or to termination of operation of the vehicle's engine while the vehicle is still in motion. However, becuase of cost considerations, the electric motor pump must be used to power the hydraulic brake booster alone, and is of insufficient capacity to operate both the hydraulic brake booster and the vehicle's power steering unit. Therefore, it is necessary to also provide a control valve which is actuated by a termination of operation of the vehicle's power steering pump and subsequent actuation of the electric motor pump to divert fluid from the vehicle's power steering gear.

SUMMARY OF THE INVENTION

Therefore, an important object of my invention is to provide a vehicle brake booster having a primary pressure source and a secondary pressure source which is actuated upon a malfunction of the primary pressure source to provide fluid power to operate the vehicle's hydraulic brake booster.

Another imprtant object of my invention is to provide a control valve in a vehicle hydraulic braking system which includes both a primary and a secondary hydraulic pump, and which diverts fluid from the vehicle's power steering gear to the hydraulic system reservoir upon actuation of the secondary fluid pressure pump.

DESCRIPTION OF THE DRAWINGS

FIG. 1 is a schematic illustration of a vehicle hydraulic braking system made pursuant to the teachings of my present invention with a typical hydraulic booster unit used therein illustrated in cross section;

FIG. 2 is transverse cross-sectional view taken substantially along line 2—2 of FIG. 1; and FIG. 3 is a transverse cross-sectional view taken substantially along line 3—3 of FIG. 1.

DETAILED DESCRIPTION

Referring now to the drawings, a hydraulic brake booster generally indicated by the numeral 10 includes a housing 12 defining a bore 14 therewithin. A primary piston 16 and a secondary piston 18 are slidably mounted within the bore 14 and define a primary chamber 20 between contiguous ends of the pistons 16 and 18 and a secondary chamber 22 between the opposite end of the piston 18 and the closed end of the bore 14. The chamber 20 is communicated to the rear wheel brakes 24 of the vehicle, and the chamber 22 is communicated to the front wheel brakes 26 of the vehicle. A caged spring assembly 28 of a construction well known to those skilled in the art is disposed between pistons 16 and 18. Fluid is communicated into the chambers 20 and 22 from a system reservoir generally indicated by the numeral 30. Conventional tilt valves 32, 34 control communication between the reservoir 30 and the chambers 20 and 22, so that fluid communication between the reservoir 30 and the chambers 20 and 22 is terminated when the pistons 16 and 18 are moved away from their brake-released position illustrated in the drawing by a very small amount. This construction is completely conventional and is well known to those skilled in the master cylinder art.

The brake booster 10 is actuated by admitting high pressure fluid into a pressure chamber 36 defined between the rightward most end of the piston 16 (viewing FIG. 1) and the corresponding end of the bore 14. Fluid communication into the pressure chamber 36 is controlled by an operator-actuated spool valve generally indicated by the numeral 38 which is slidably mounted within a bore 40 defined within the piston 16. The valve 38 is shifted in the bore 40 by an actuating rod 42, one end (not shown) of which is connected to a conventional brake pedal mounted in the vehicle operator's compartment. The actuating rod 42 carries an abutment 46 which engages a corresponding abutment 48 on piston 18 upon malfunction of both the primary and secondary pressure sources so that the brake booster may be actuated manually.

The outer periphery of the spool valve 38 is provided with grooves 50, 52 and lands 54, 56 which cooperate with corresponding grooves 58, 60 and lands 62, 64 provided on the wall of the bore 40. A passage 66 communicates the groove 50 with the pressure chamber 36. The spool valve 38 is shiftable within the bore 40 to control communication between the grooves 50, 52 and 58, 60 as will be hereinafter described. The spool valve 38 is illustrated in FIG. 1 as being disposed in its neutral or brake released position, and a spring 68 yieldably urges the spool valve 38 toward the position illustrated in the drawing.

The outer circumferential surface of the piston 16 is provided with a first set of diametrically opposed slots 70, 72, a second pair of diametrically opposed slots 74, 76, and a third pair of diametrically opposed slots 78, 80. A first inlet portion 82 communicates the slots 70, 72 with the outlet or high pressure side of the vehicle's power steering pump 84. A second inlet port 86 communicates the slots 70, 72 with the outlet or high pressure side 87 of an auxiliary pump 88. The auxiliary pump 88 is preferably powered by an electric motor operated by the vehicle's battery. The inlet or low pressure side 90 of the pump 88 is communicated to the reservoir 30. Check valves 92 and 94 are provided to prevent flow of fluid out of the other inlet port when fluid flows into one of the inlet ports 82 or 86. An outlet passage 96 communicates the diametrically opposed slots 74, 76 with the vehicle's power steering gear 98. The outlet of the vehicle power steering gear 98 and the inlet of the power steering pump 84 are both communicated to the reservoir 30, as illustrated in FIG. 1. The diametrically opposed slots 78 and 80 are also communicated to the reservoir 30 through passage means generally indicated by the numeral 100. Referring again to FIG. 1, the groove 60 is communicated to the slots 80 and 78 and, therefore, to the system reservoir 30. Similarly, the groove 58 is communicated to the slot 70, 72, and the groove 52 is communicated to the slot 74, 76 and therefore, to the gear 98.

Referring now to FIG. 3 of the drawings, a control valve generally indicated by the numeral 102 is provided to terminate fluid communication to the power steering gear 98 upon termination of operation of the primary power steering pump 84 and subsequent actuation of the electric motor pump 88. As described hereinabove, the electric motor pump is of insufficient capacity to supply fluid power to both the brake booster 10 and the power steering gear 98. Therefore, when a malfunction of the power steering pump 84 is sensed by an appropriate flow sensing switch 104 which actuates the electric motor pump 88, fluid communication to the power steering gear 98 must be terminated. The control valve 102 includes a bore 106 defined within the the housing 12 which is divided into a first compartment generally indicated by the numeral 108 and a second compartment generally indicated by the numeral 110. The compartment 108 is provided with a first valve seating area 112 and a second valve seating area 114 which divides the compartment 108 into a first section 116 which is communicated to the inlet of the power steering gear 98, a second section 118 defined between the valve seats 112 and 114 which is communicated to the outlet passage 96 and therefore to diametrically opposed grooves 74 and 76, and a third section 120 which is communicated to the reservoir 30 by passage means 122. A valve element 124 is slidably disposed in the section 118 and is shiftable into and out of sealing engagement with the valve seats 112 and 114. A differential pressure responsive piston 128 is slidably disposed within the chamber 110 and divides the latter into a first section 130 and a second section 132. The section 130 is communicated with the inlet port 82, and therefore to the outlet or high pressure side of the vehicle's power steering pump 84. The section 132 of chamber 110 is communicated to the outlet of the electric motor pump 88. A rod 136 interconnects the piston 128 and the valve element 124 so that movement of the piston 128 shifts the valve element 124 from sealing engagement with one of the valve seats into sealing engagement with the other valve seat as will be described in detail hereinafter.

MODE OF OPERATION

The various components of the brake booster 10 are illustrated in the Figures in the positions in which they assume when the brakes of the vehicle are released. Referring to FIG. 1, the spool valve 38, is disposed so that substantially uninhibited fluid communication is permitted between the grooves 50 and 60 so that the pressure chamber 36 is vented to the reservoir 30 through the passage 66, the grooves 50 and 60, the slots 78, 80, and the passage means 100. Similarly, the land 62 is lapped with land 56 so that communication between the grooves 58 and 50 is prevented. Also, as can be seen in FIG. 1, substantially uninhibited fluid communication is permitted between grooves 58 and 64, so that substantially all of the fluid flowing into the inlet port 82 from the outlet of the pump 84 is communicated directly to the inlet of the gear 98 through inlet port 82, slots 70, 72 the grooves 58 and 64, the outlet passage 96, and the compartment 108 of the control valve 102. When a brake application is effected by urging the spool valve 38 to the left viewing FIG. 1, land 54 first laps with the land 62 to thereby terminate fluid communication between the pressure chamber 36 and the reservoir 30. At the same time, the orifice defined between the land 56 and the land 64 is reduced, thereby restricting flow of fluid between the grooves 58 and 52 to develop back pressure in the groove 58. Also, at substantially the same time, an orifice is opened between the lands 56 and 62 to permit the high pressure fluid developed in the groove 58 to communicate into the groove 50, and therefore, into the pressure chamber 36 through the passage 66. High pressure fluid in the pressure chamber 36 acts upon right hand end of the piston 16, to urge the latter to the left viewing FIG. 1. Movement of the piston 16 is transmitted to the piston 18 through the caged spring assembly 28, and therefore also moves the piston 18 to the left. As the piston 16 and 18 are moved to the left, the tilt valves 32 and 34 are first closed, and further movement of the piston 18 pressurizes fluid in the chamber 22, and thereafter movement of the piston 16 relative to the piston 18 pressurizes the fluid in the chamber 28. Pressurization of the fluid in the chambers 28 and 22 are communicated to the brakes of the vehicle 24 and 26, respectively, to thereby effect a brake application. When the brakes of the vehicle are released, the spring 68 urges the valve 38 to the brake-release position, thereby venting the pressure chamber 36 to the reservoir 30, to permit the cage spring assembly 28 and another spring 138 acting against the piston 18 to urge the pistons 16 and 18 to the right viewing FIG. 1, toward the brake-released position illustrated in the drawings.

Fluid pressure is normally supplied to the booster 10 by the vehicle's power steering pump 84. However, the fluid pressure supply to the booster 10 may be interrupted for a number of reasons. For example, one of the fluid lines interconnecting the pump 84 and the gear 98 with the booster 10 may rupture. Also the vehicle's engine may die while the vehicle is descending a grade, thereby interrupting fluid communication to th booster 10 and requiring a manual actuation of the vehicle's brakes when a maximum braking effort would be required. Also, the pump itself may malfunction. For all of these reasons, an auxiliary or back-up pump 88 has been provided to supply fluid pressure to the booster 10 in just such an emergency. However, as pointed out above, to design electric motor pump 88 large enough to operate both the booster 10 and the power steering gear 98 would be prohibitively costly. Therefore, the control valve 102 has been provided to terminate fluid communication between the booster 10 and the power steering gear 98 during a malfunction of the vehicle's power steering pump 84. When lack of fluid flow into the inlet port 82 is sensed by the flow-sensing switch 104, the switch 104 actuates the electric motor pump 88.

The various components of the control valve 102 are illustrated in FIG. 3 in the positions which they assume when the pump 84 is operating normally. Since the electric motor pump is not operating, fluid pressure in the section 132 of compartment 110 will be at a relatively low level, and fluid pressure in the section 130 of chamber 110 will be at least a minimum pressure level equal to the back pressure developed in the hydraulic system by the pressure required to circulate fluid through the fluid lines. Therefore a force acts upon the piston 128 urging the latter to the right viewing FIG. 3, thereby maintaining the valve element 124 sealed against the valve seat 114 to permit substantially uninhibited fluid communication from the booster 10 to the power steering gear 98. However, when the aforementioned malfunctioning results in termination of the fluid pressure output of the power steering pump 84 and actuation of the electric motor pump 88, the fluid pressure level in the section 130 of chamber 110 drops abruptly. At the same time, when the electric motor pump 88 begins producing output pressure, the pressure level in section 132 of chamber 110 is increased appreciably, thereby urging the piston 128 to the left viewing FIG. 3. This movement of the piston is transmitted to the valve element 124 by the rod 136, thereby urging the valve element 124 away from the valve seat 114 and into sealing engagement with the valve seat 112. Therefore, communication to the power steering gear 98 is terminated, and a passage defined between the valve element 124 and the valve seat 114 is opened to permit fluid to flow from the outlet passage 96 back to the reservoir 130 through the section 120 and passage 122, as illustrated in FIG. 3. Therefore, the entire fluid supply of the system is confined to the brake booster, so that no fluid will be lost if one of the lines interconnecting the booster, the pump 84 or the gear 98 has ruptured. Also, since flow to the gear 98 is terminated, the fluid pressure output of the electric motor pump 88 is conserved for use solely by the brake booster 10. When the pump 84 is repaired, or the vehicle's engine is restarted, the increased pressure to the flow-sensing switch 104 causes the latter to turn off the electric motor pump 88, thereby reducing the fluid pressure level in section 132 of the chamber 110 and simultaneously increasing the fluid pressure level in the section 130 of the latter, to bring the valve element 124 back into sealing engagement with the valve seat 114. Fluid communication through the passage 122 to the reservoir 30 is then terminated and fluid communication to the steering gear 98 is re-established.

I claim:

1. In a vehicle braking system having a fluid reservoir, a primary fluid pressure pump, a secondary fluid pressure pump actuated upon failure of said primary pump, and a brake booster communicated to said primary and secondary pump:

said brake booster having an inlet communicated to each of said pumps, an outlet, and operator-actuated valve means controlling fluid communication between said inlet and outlet to effect a brake application;

means responsive to failure of said primary pump to actuate said secondary pump; and control valve means communicated to the outlet of each of said pumps and responsive to decrease of the fluid pressure output of said primary pump and resultant actuation of said secondary pump to shift from a first position permitting fluid communication through said outlet to a second position blocking fluid communication through said outlet;

said control valve means including a valve element and a differential pressure responsive piston for actuating said valve element;

one face of said piston being communicated to the outlet of said secondary pump, whereby upon failure of said primary pump and subsequent actuation of said secondary pump said control valve means shifts from said first position to said second position.

2. The invention of claim 1:

said control valve means in said second position diverting flow of fluid from said outlet to said reservoir.

3. The invention of claim 1:

said control valve means in said second position diverting flow of fluid from said outlet port to said reservoir.

4. The invention of claim 1:

said valve element including a surface exposed to the fluid pressure level communicated to said outlet, said surface having an effective area less than the effective area of said piston face communicated to the outlet of said primary pump whereby said control valve means is maintained in said first position when the fluid pressure level communicated to the outlet port equals the fluid pressure output of said primary fluid pressure pump.

5. The invention of claim 4:

said control valve means including a housing defining a compartment therewithin, a pair of valve seating members dividing said compartment into first, second, and third sections, said first section being communicated to said outlet, said second section having an inlet to permit fluid communication into said second section, said third section being communicated to said reservoir;

said valve element engaging one of said valve seats to prevent communication between the second and third section when the control valve means is disposed in the first position, said valve element engaging the othr valve seat to prevent communication between said first and second sections when said control valve means is disposed in said second position.

6. In a vehicle braking system having a fluid reservoir, a primary fluid pressure pump, a secondary fluid pressure pump actuated upon failure of said primary pump, and a brake booster communicated to said primary and secondary pumps;

said brake booster having an inlet communicated to each of said pumps, an outlet and operator-actuated valve means controlling fluid communication between said inlet and outlet to effect a brake application;

means responsive to failure of said primary pump to actuate said secondary pump; and control valve means communicated to the outlet of each of said pumps and responsive to decrease of the fluid pressure output of said primary pump and resultant actuation of said secondary pump to shift from a first position permitting fluid communication through said outlet to a second position blocking fluid communication through said outlet;

said control valve means including a housing defining a bore therewithin, means dividing said bore into a pair of compartments, one of said compartments being communicated to said outlet port and to said reservoir, a pressure differential responsive piston mounted in the other compartment dividing the latter into a first section communicated to said primary fluid pressure pump and a second section communicated to said secondary fluid pressure pump, a valve element mounted in said one compartment and operably connected to said piston whereby movement of said piston moves said valve element to a position diverting fluid flow through said outlet to said reservoir.

7. The invention of claim 6:

said control valve means further including a pair of valve seats dividing said one compartment into a first section communicated to said outlet, a second section, and a third section communicated to said reservoir, said piston moving said valve element from said first piston defined by sealing engagement of said valve element with one of said valve seats to prevent fluid communication to said reservoir to said second piston defined by engagement of said valve element with the other valve seat to prevent fluid communication to said outlet port.

8. In a vehicle braking system having a fluid reservoir, a primary fluid pressure pump, a secondary fluid pressure pump actuated upon failure of said primary pump, and a brake booster communicated to said primary and secondary pumps:

said brake booster including a housing having an inlet communicated to each of said pumps, an outlet, an exhaust communicated to said reservoir, fluid pressure responsive means for effecting a brake application, operator-actuated valve means shiftable from a first condition venting said fluid pressure responsive means to said exhaust and communicating substantially all of the fluid flow through said inlet to said outlet to a second position terminating fluid communication between said exhaust and said fluid pressure responsive means and initiating fluid communication between the latter and said inlet to effect a brake application, and means responsive to failure of said primary pump to actuate said secondary pump; and control valve means including a pressure differential responsive piston comparing the fluid pressure output of said primary and secondary pumps, and a valve element operated by said piston to divert flow of fluid from said outlet to said reservoir upon decrease of the fluid pressure output of said primary pump and subsequent increase of the fluid pressure output of said secondary pump.

9. The invention of claim 8:

said control valve means including a housing defining a bore threwithin; means dividing said bore into a pair of compartments, a pair of valve seats dividing one of said compartments into a first section communicated to said outlet, a second section, and a third section communicated to said reservoir, said valve element being slidably mounted for engagement with each of said seats, said piston being mounted in the other compartment and dividing the latter into a first section communicated with said primary pump and a second section communicated to said secondary pump, said piston shifting said valve element from engagement with one of said seats preventing communication to said reservoir to a position preventing communication to said outlet and permitting communication from said second section to said reservoir upon failure of said primary pump and actuation of said secondary pump.

* * * * *